Nov. 29, 1960

H. C. HADLEY 2,961,820

GATHERING AND CONVEYING MECHANISM FOR
CORN PICKERS AND THE LIKE

Filed Sept. 5, 1958

INVENTOR.
H. C. HADLEY

United States Patent Office 2,961,820
Patented Nov. 29, 1960

2,961,820

GATHERING AND CONVEYING MECHANISM FOR CORN PICKERS AND THE LIKE

Howard C. Hadley, Des Moines, Iowa, assignor to Deere & Company, Moline, Ill., a corporation of Delaware Filed Sept. 5, 1958, Ser. No. 759,310

5 Claims. (Cl. 56—119)

This invention relates to a machine for harvesting row-planted crops such as corn. More particularly, the invention relates to improved means for gathering and handling the corn so as to facilitate the removal of ears therefrom and the transfer of removed ears to means for further handling or treating the ears.

A typical corn harvester will comprise a mobile frame advanceable over a field of corn and having inner and outer gatherer elements which between them define a fore-and-aft extending passageway containing a plurality of movable parts for handling the corn, particularly fore-and-aft and upwardly and rearwardly inclined snapping rolls for removing the corn ears from the stalks and for causing the ears to move laterally in one direction, together with means such as gathering chains and the like for causing the stalks to move rearwardly relative to the forwardly moving harvester and also to some extent to guide and hold the stalks while they are being acted on by the snapping means. It is also conventional to provide along one of the gatherer elements what is known as a first elevator for removing the snapped ears and for conveying the ears rearwardly to husking mechanism, shelling mechanism or simply a receptacle in the case of a corn snapper in which the machine does not act to husk the ears.

In its broadest aspects, the invention aims to improve the gathering mechanism by extending the first elevator sufficiently far forwardly so as to operate in effect as a gathering chain, thus eliminating the need for a gathering chain at that side of the snapping means. It is a further object to provide in the first elevator a trough having a downwardly concave or depressed portion adjacent to the forward end of the snapping means, together with a flexible chain guided to conform to the floor, whereby the extreme forward loop of the conveyor chain will be at a level higher than the forward end of the snapping means and slightly ahead of the snapping means front end. A further object is to equip the conveyor chain with laterally extending flights which are so arranged relative to a wall portion of the trough proximate to the snapping means so that the flights project above this wall and facilitate in the handling of "down" stalks, which are stalks bent downwardly from their normal upright positions, as by the weather, animals, other causes, etc., but still bearing corn ears worth harvesting.

The foregoing and other important objects and desirable features inherent in and encompassed by the invention will become apparent as a preferred embodiment thereof is disclosed, by way of example, in the ensuing description and accompanying sheet of drawings, the several figures of which are described immediately below.

Figure 1:
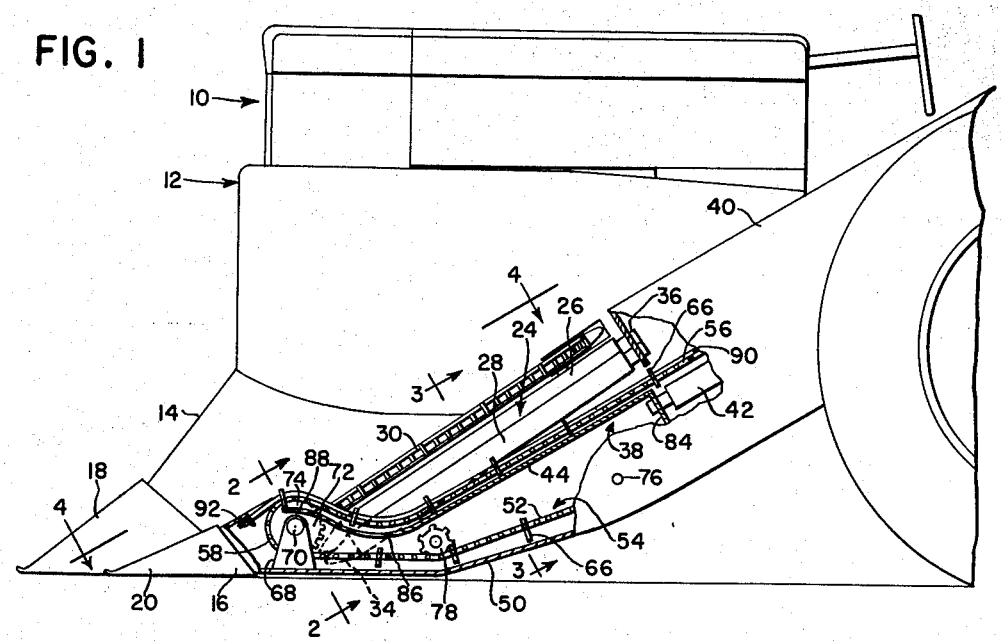
Fig. 1 is a side elevational view with portions broken away and other portions shown in section, illustrating the improved gathering and conveying mechanism.

In the harvester chosen for purposes of illustration, the harvesting mechanism is carried by a typical farm tractor, designated in its entirety by the numeral 10. This tractor thus provides a mobile supporting frame for carrying the harvester, indicated in its entirety by the numeral 12, for advance over a field of corn. The general nature of tractor-mounted corn harvesters is so well known as to require no elaboration here.

The harvester parts which are material as a background for the invention comprise the gathering mechanism itself, which is here, as is conventional, made up of an inner side sheet or element 14 and an outer side sheet or element 16. These thus comprise first and second fore-and-aft extending elements which terminate at their forward ends respectively as gathering points 18 and 20 and which between them define a fore-and-aft relatively narrow stalk-receiving passageway 22 in which standing stalks are received as the machine advances over the field. As is typical of the general construction along these lines, the inner side sheet 14 is part of a sheet metal structure that encloses the proximate side of the tractor, and the outer element 16 is in the nature of a sheet metal housing having a cross sectional shape in the form of an inverted U, primarily to afford smooth flowing surfaces so as not to become entangled with the crop, as well as for other purposes, as will presently appear.

The gathering mechanism further includes fore-and-aft extending snapping means, indicated in its entirety by the numeral 24, and here typically comprising a pair of parallel snapping rolls 26 and 28. Also as is conventional, the snapping rolls although they incline upwardly and rearwardly and are generally parallel are vertically offset so that the inner snapping roll 26, which lies proximate to the inner side sheet 14, is at a higher level than the outer snapping roll 28, and the snapping rolls rotate toward each other in opposite downward directions so as to remove ears from stalks received between them and to cause the ears to move laterally toward the element 16.

For the purpose of facilitating the rearward movement of stalks as the machine advances, the gathering mechanism comprises or includes an inner gathering chain 30 which has laterally inwardly projecting lugs 32 that reach outwardly over the inner snapping roll 26. In a conventional corn harvester, a second gathering chain would be used in conjunction with the inner snapping roll 28, but it is in this respect that the present invention departs from conventional design.

As previously stated, the action of ear removal from the stalks by the snapping means 24 causes the ears to move laterally toward the element 16. This is likewise true in the conventional corn picker, but this action normally takes place at a considerable distance rearwardly of the front end of the snapping means. Since the front end of the snapping means is fairly important in the present disclosure, it is designated as to location by the reference numeral 34. The location of the rear end of the snapping means will be apparent from the manner in which the rolls are supported in bearings in a transverse upper wall 36, (Fig. 1). The element 16 carries means affording a fore-and-aft trough 38 which lies just outwardly of the snapping means 24 for receiving ears therefrom and which here comprises a forward extension of the first elevator or conveyor 40. In a conventional structure, the first elevator will include means rearwardly of the snapping means 24 for receiving ears as the ears are conveyed rearwardly. Such receiving means may take the form of a corn sheller, husking rolls or simply a receptacle in the case of a corn snapper. For purposes of illustration, the receiving means is shown here as including husking mechanism, at least one roll of which is visible at 42 in Fig. 1.

Figure 5:
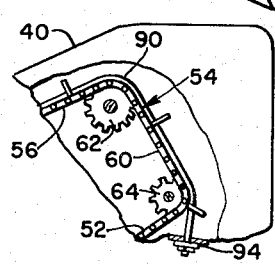
Fig. 5 is a fragmentary view, with portions broken away, illustrating the upper end construction of the first elevator and its associated housing.

The trough 38 has a floor 44 and inner and outer side walls 46 and 48, respectively. At the forward portion of the machine, the wall 48 may be considered part of the element 16, or the inner leg of the U-shaped section of said element. The element 16 may be further constructed so as to include a secondary or under floor 50 for purposes of adding to the enclosure of the lower run 52 of a fore-and-aft extending flexible conveyor indicated in its entirety by the numeral 54. This conveyor, in addition to the lower run 52, has an upper run 56, a lower forward loop 58 and an upper or rearward loop 60 (Fig. 5). This upper loop is carried by a pair of vertically spaced apart rotary members or sprockets 62 and 64 at a rearward part of the first elevator housing 40, much in the manner disclosed in the U.S. patent to Slavens 2,622,382. The typical illustration resorted to here is merely for the purpose of showing a representative upper support for the conveyor or chain 54.

The general relationship of the conveyor or chain 54 to the trough 38 is that the upper run overlies the floor 44 and the lower run 52 returns forwardly over the under or secondary floor 50. One of the significant features is that the forward loop 58 of the chain is disposed extremely far forwardly, preferably lying ahead of the front end 34 of the snapping means 24. In addition, the floor 44 is configured in such manner that the chain is depressed, in its upper run, immediately rearwardly of the front loop 58, so that the depressed or concave portion is adjacent to the front end 34 of the snapping rolls, whereas the major portion of the upper run 56 occupies generally the same inclination as the snapping rolls. In addition, the upper run 56 functions in the usual manner of a first elevator chain in that it carries ears removed by the snapping means 24 in an upwardly and rearwardly direction to the husking means 42 illustrated by way of example here. As already indicated, the rearward removal may be for other purposes. Because of the forward extension of the chain 54 and its configuration, as will be presently described, the chain functions additionally as a gathering chain. For both purposes, the chain is equipped with laterally projecting lugs 66, the details of which will be described subsequently.

The main support for the front loop 58 of the chain 54 comprises several parts, one of which is a bracket 68 providing a bearing on a transverse axis for a cross shaft 70. As best seen in Fig. 1, it will be noted that this shaft is ahead of and at a level higher than that of the front end 34 of the snapping means 24. An additional part of the support includes a rotary part here in the form of a sprocket 72 keyed to the shaft 70 and of such diameter that its upper peripheral portion, as at 74, projects above the level of the front end 34 of the snapping means 24. Thus, the upper run 56 of the chain 54 extends from the upper peripheral portion 74 of the front sprocket 72 to the upper rear loop 70 at which point it is trained over the upper sprocket 62 (Fig. 5). From there, it returns forwardly under the lower rear sprocket 64 as the previously described upper run 52, thence under a pair of idlers, the shaft for the rear one of which is indicated at 76, and the front one of which is indicated at 78. The chain 54 may be driven in any suitable manner, as via a sprocket 80 keyed to the outer end of the shaft 70 and driven by a chain 82, which details are not material here.

The major rear portion of the floor 44 occupies generally the same inclination as the snapping means 24, and this rear portion of the floor, in the instance disclosed, terminates at a transverse rear wall 84 ahead of the husking roll 42. The floor extends forwardly and is downwardly concave or bowed at 86 and then curves upwardly and forwardly at 88 to a point adjacent to the upper peripheral portion 74 of the sprocket 72. The forward portion of the upper run 56 of the chain 54 is caused to conform to the floor throughout the length of the floor as well as over the husking roll 42 and around the rear loop 60 by guide means, here in the form of a fore-and-aft extending rod 90 supported at its front end at 92 and at its rear end at 94. These supports may take any suitable form, those shown being merely representative. The rod is of circular cross section and engages the upper run 56 of the chain 54 from above to perform the hold-down and guide function. The front portion of the floor 44 is, of course, slotted, as at 96 (Fig. 2), to accommodate the sprocket 72.

Figure 2:
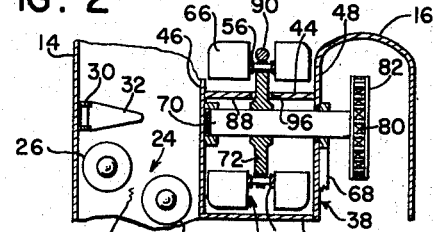
Fig. 2 is an enlarged transverse section on the line 2—2 of Fig. 1.
Figure 3:
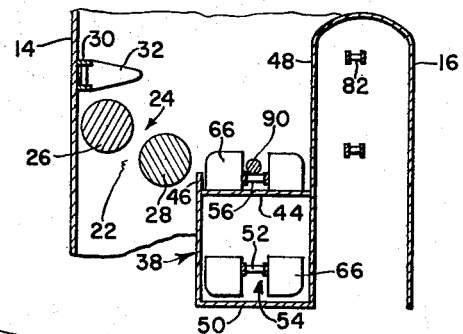
Fig. 3 is an enlarged section on the line 3—3 of Fig. 1.
Figure 4:
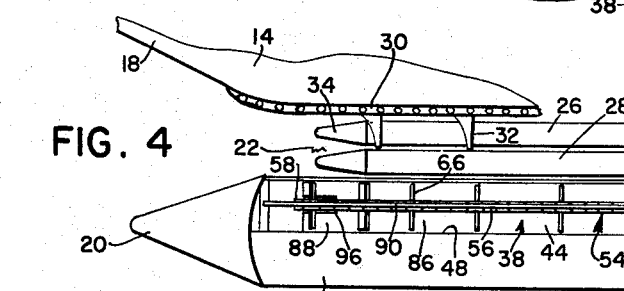
Fig. 4 is a fragmentary plan view as seen generally along the line 4—4 of Fig. 1.

As best shown in Fig. 2, the flights 66 not only extend laterally from opposite sides of the chain 54 but they have sufficient height so that the flights project above the inner trough wall 46. This is significant especially in the zone of the front end 34 of the snapping means 24, because stalks lying outwardly over the gathering point 20 and thus over the forward portion of the element 16 can be engaged by the upper inner corners of these flights, whereby the flights facilitate in picking up "down" stalks.

The salient features of the invention have been described in connection with the description and operation of the preferred embodiment thereof. Features other than those so enumerated will readily occur to those versed in the art, as will many modifications and alterations in the disclosed structure, all of which may be achieved without departure from the spirit and scope of the invention.

What is claimed is:

1. In a corn harvester having a mobile frame advanceable over a field of corn and including gathering mechanism having a pair of fore-and-aft closely laterally spaced apart elements defining a stalk-receiving passageway in which fore-and-aft snapping means extend rearwardly and upwardly from a ground-proximate front end to a higher rear end for removing ears from received stalks and for causing such ears to be moved laterally toward one element, the improvement comprising: means on said one element affording a fore-and-aft trough for receiving ears from the snapping means, said trough having a floor beginning at a forward end generally alongside but at a level higher than the front end of the snapping means and extending rearwardly and downwardly and thence extending rearwardly and upwardly generally at the same inclination as the snapping means; a rearwardly and upwardly moving flexible conveyor travelling in the trough; and means acting on the conveyor to conform said conveyor to the shape of the trough floor.

2. The invention defined in claim 1, in which: the trough includes a fore-and-aft wall rising therefrom adjacent to the snapping means, and the conveyor has flights thereon projecting laterally toward said wall and projecting above said wall to facilitate handling of "down" stalks at the front end of the snapping means.

3. In a corn harvester having a mobile frame advanceable over a field of corn and including gathering mechanism having a pair of fore-and-aft closely laterally spaced apart elements defining a stalk-receiving passageway in which fore-and-aft snapping means extend rearwardly and upwardly from a ground-proximate front end to a higher rear end for removing ears from received stalks and for causing such ears to be moved laterally toward one element, the improvement comprising: means on said one element affording a fore-and-aft trough for receiving ears from the snapping means, said trough having a floor beginning at a forward end generally alongside but at a level higher than the front end of the snapping means and extending rearwardly and downwardly and thence exending rearwardly and upwardly generally at the same inclination as the snapping means; bearing means on a transverse axis at the forward end of the trough; a rotary part journaled on the bearing means and having such diameter as to dispose an upper peripheral portion thereof above the level of said forward end of the trough; an endless flexible conveyor having an upper run moving rearwardly in the trough and over the floor and having a front loop trained about said rotary part.

4. In a corn harvester having a mobile frame advanceable over a field of corn and including gathering mechanism having a pair of fore-and-aft closely laterally spaced apart elements defining a stalk-receiving passageway in which fore-and-aft snapping means extend rearwardly and upwardly from a ground-proximate front end to a higher rear end for removing ears from received stalks and for causing such ears to be moved laterally toward one element, the improvement comprising: means on said one element affording a fore-and-aft trough for receiving ears from the snapping means, said trough having a floor beginning at a forward end generally alongside the front end of the snapping means and extending rearwardly and upwardly generally alongside the snapping means and a fore-and-aft wall extending alongside the snapping means; a rearwardly and upwardly moving flexible conveyor having flight means thereon and travelling in the trough, said flight means extending above the wall whereby the upper portion of the flight means will be exposed to contact stalks leaning toward said trough; and means acting on the conveyor to conform said conveyor to the shape of the trough floor.

5. In a corn harvester having a mobile frame advanceable over a field of corn and including gathering mechanism having a pair of fore-and-aft closely laterally spaced apart elements defining a stalk-receiving passageway in which fore-and-aft snapping means extend rearwardly and upwardly from a ground-proximate front end to a higher rear end for removing ears from received stalks, the improvement comprising: a forward support on one element offset laterally from the snapping means and positioned generally alongside but at a level higher than the front end of the snapping means; guide means on said one element immediately rearwardly of and in fore-and-aft alinement with the support and at a level below said support; and an endless flexible fore-and-aft conveyor having a forward loop trained over the support and an upper run extending from said loop, beneath the guide means and thence upwardly and rearwardly alongside the snapping means.

References Cited in the file of this patent

UNITED STATES PATENTS

| | | |
|---|---|---|
| 876,189 | Ingersoll | Jan. 7, 1908 |
| 976,223 | Small | Nov. 22, 1910 |
| 1,180,548 | Shelton | Apr. 25, 1916 |
| 2,252,377 | Hyman | Aug. 12, 1941 |